United States Patent
Pasztor et al.

(10) Patent No.: US 12,444,239 B2
(45) Date of Patent: Oct. 14, 2025

(54) SYSTEM AND METHOD OF SEAMLESS TRANSFER TO REMOTE CERTIFIED DIAGNOSTIC TOOL

(71) Applicant: Robert Bosch GmbH, Stuttgart (DE)

(72) Inventors: Matthew Gerald Pasztor, Kalamazoo, MI (US); Kevin Gray, Kalamazoo, MI (US); Troy Liebl, Owatonna, MN (US)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 18/068,900

(22) Filed: Dec. 20, 2022

(65) Prior Publication Data

US 2023/0215222 A1    Jul. 6, 2023

Related U.S. Application Data (60) Provisional application No. 63/295,592, filed on Dec. 31, 2021.

(51) Int. Cl.
*G07C 5/00* (2006.01)
*G07C 5/08* (2006.01)

(52) U.S. Cl.
CPC ............ *G07C 5/006* (2013.01); *G07C 5/008* (2013.01); *G07C 5/0808* (2013.01); *G07C 5/0825* (2013.01); *G07C 2205/02* (2013.01)

(58) Field of Classification Search
CPC .. B60W 30/08; B60W 30/04; G06Q 30/0645; G01C 21/3438; G07C 5/00; G07C 5/006; G07C 5/0825; G07C 5/008; G07C 5/0808; G07C 2205/02; A42B 3/0466; H04L 63/08

USPC .................................................. 701/29.1, 36
See application file for complete search history.

(56) References Cited

U.S. PATENT DOCUMENTS

| | | | | |
|---|---|---|---|---|
| 7,913,242 B2* | 3/2011 | Holland | ............. | G06F 8/65 |
| | | | | 701/1 |
| 2007/0156311 A1* | 7/2007 | Elcock | ............. | G07C 5/008 |
| | | | | 701/31.4 |
| 2009/0222161 A1* | 9/2009 | Tsai | ............. | G06Q 10/04 |
| | | | | 701/29.5 |
| 2010/0114426 A1 | 5/2010 | Boss et al. | | |
| 2018/0126952 A1 | 5/2018 | Niemiec | | |
| 2020/0298841 A1* | 9/2020 | Viner | ............. | B62J 27/00 |
| 2021/0350336 A1 | 11/2021 | Vanderveen et al. | | |
| 2023/0101560 A1 | 3/2023 | Ghamsari et al. | | |
| 2023/0401900 A1* | 12/2023 | Merg | ............. | G07C 5/0816 |

\* cited by examiner

*Primary Examiner* — Andrew Joseph Rudy
(74) *Attorney, Agent, or Firm* — David Kovacek; Maginot, Moore & Beck LLP (57) ABSTRACT

A system and method for performing service actions on a vehicle according to a ruleset. The ruleset classifies serviceable conditions of the vehicle according to rules defined within the ruleset. A diagnostic tool is utilized to perform the service actions and is configured to establish data communication with other diagnostic devices that the rules indicate may be required for a certified service action. After the completion of the service actions, certified repair results are generated indicating successful completion of the service action.

20 Claims, 3 Drawing Sheets

| 201 | Executable Instructions |

| 203 | User Profiles |

205

| 207 | Contractual Rules related to User |

| 209 | Technical Certification Rules related to User |

| 211 | Rules based on Statute |

| 213 | Contractual Rules related to Diagnostic Tool |

| 215 | Contractual Rules related to Subject Vehicle |

| 217 | Rules related to Insurance Provider |

| 219 | Rules related to Warranty Conditions |

SYSTEM AND METHOD OF SEAMLESS TRANSFER TO REMOTE CERTIFIED DIAGNOSTIC TOOL

TECHNICAL FIELD

This disclosure relates to diagnostic tools used to perform diagnostic and service actions on automobiles.

BACKGROUND

Modern vehicle service actions are often guided by diagnostic tools configured to communicate with a vehicle communication interface (VCI) of a vehicle. The VCI provides information about service actions required to place the vehicle into proper functioning condition. Service actions may comprise routine maintenance, repairs, calibrations, or other service to the vehicle or its components that are designated Or recommended by the manufacturer or statute for proper operation.

Currently, some service actions may be related to special arrangements for the operation of the vehicle. For example, an insurance company paying for a covered repair may require the technicians to have certain certifications or utilize particular tools. Warranty repairs may provided under conditions dictated by the manufacturer, such as using specialized tools for diagnostics. Municipalities may require technicians to hold certain certifications to provide legally-recognized certifications, such as emissions certifications or safety inspections. A vehicle may require a combination of diagnostic tools to fulfill these requirements and provide certifiable service to the vehicle. This "juggling" of diagnostic tools slows work and increases complexity of the service actions for technicians. What is desired is a method to allow a technician to perform all of the operations for a vehicle without having to physically switch diagnostic tools mid-service, while still conforming to all necessary obligations for a certified service action.

SUMMARY

One aspect of this disclosure is directed to a method of generating repair guidance for a subject vehicle by a diagnostic processor. The method comprises identifying a user of the diagnostic processor, establishing data communication between the diagnostic processor and a vehicle communication interface (VCI) associated with the subject vehicle, acquiring vehicle identification data (VID) and diagnostic data from the VCI and classifying each serviceable condition onto one of a plurality of list subsets according to a ruleset. The diagnostic data indicates a list of serviceable conditions of the subject vehicle. The ruleset indicates rules that define limitations of service actions based upon the user, the VID, and the diagnostic data. The method further comprises generating an unrestricted output signal to guide the user for a service action responsive to each unrestricted serviceable condition in an unrestricted list subset, the unrestricted list subset comprised of serviceable conditions associated with no restrictions in the ruleset. The method further comprises generating a certified list subset comprised of serviceable conditions associated with a restriction in the ruleset, transmitting a certified list subset to a certified processor in data communication with the diagnostic processor, and acquiring a certified output signal from the certified processor, the certified output signal configured to guide the user for a service action responsive to each serviceable condition listed in the certified list subset. transmitting the certified output signal to the display. The unrestricted output signal and the certified output signal may be transmitted to a display to guide the user through a diagnostic or service action.

Another aspect of this disclosure is directed to a vehicle diagnostic system configured to generate a set of certified repair results. The vehicle diagnostic system may comprise a diagnostic processor, a memory in data communication with the diagnostic processor, a display in data communication with the diagnostic processor, a transceiver in data communication with the diagnostic processor, and a certified processor in data communication with the diagnostic processor via the transceiver. The memory may store thereon a ruleset associated with a user of the vehicle diagnostic system. The diagnostic processor may be configured to establish data communication with a vehicle communication interface (VCI) of a subject vehicle during a service action, wherein the diagnostic processor is further configured to acquire vehicle identification data (VID) and diagnostic data from the VCI. The diagnostic processor may be further configured to distinguish a unrestricted subset of the diagnostic data and a restricted subset of the diagnostic data according to the ruleset. The diagnostic processor may be further configured to generate a first output signal for the display guiding a user to address the unrestricted diagnostic data in response to the unrestricted diagnostic data. The diagnostic processor may be configured to act as an intermediary transceiver between the VCI and the certified processor to address the restricted diagnostic data wherein the certified processor is configured to generate a second output signal for the display guiding a user to address the restricted diagnostic data in response to receiving the restricted diagnostic data.

A further aspect of this disclosure is directed to a method of generating repair guidance for a subject vehicle by a diagnostic processor. The method comprises identifying a user of the diagnostic processor, establishing data communication between the diagnostic processor and a vehicle communication interface (VCI) associated with the subject vehicle, acquiring vehicle identification data (VID) and diagnostic data from the VCI, the diagnostic data indicating a list of serviceable conditions of the subject vehicle, and classifying each serviceable condition onto one of a plurality of list subsets according to a ruleset. The ruleset indicates rules defining limitations of service actions based upon the user, the VID, and the diagnostic data. The method further comprises generating an unrestricted output signal to guide the user for a service action responsive to each unrestricted serviceable condition in an unrestricted list subset and generating a certified list subset. The unrestricted list subset comprises serviceable conditions associated with no restrictions in the ruleset, and the certified list subset comprises serviceable conditions associated with a restriction in the ruleset. The method further comprises transmitting the certified list subset to a certified processor in data communication with the diagnostic processor, and acquiring a certified output signal from the certified processor. The method further comprises transmitting the unrestricted output signal to a display and transmitting the certified output signal to the display. The unrestricted output signal and the certified output signal each are configured to guide the user through a service action of the vehicle. In some embodiments, the method may be performed by a processor executing instructions stored upon a non-transitory computer-readable storage medium.

DETAILED DESCRIPTION

The illustrated embodiments are disclosed with reference to the drawings. However, it is to be understood that the disclosed embodiments are intended to be merely examples that may be embodied in various and alternative fours. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Modern automotive vehicles comprise a large amount of electronic devices in communication with each other, such as sensors, displays, controllers, electric motors, and other components having electronic parts. Service of these components often relies upon a diagnostic tool that is configured to communicate with the electronic components of the vehicle. Different service actions may require different expertise on the part of the technician or different diagnostic tools. These requirements may be enforced by contract with a payment provider, contract with a manufacturer, or legal requirement. In such scenarios, a technician may need to rely upon multiple diagnostic tools to satisfy the requirements they are subject to, which increases complexity of the service actions and slows the technician's work. It is therefore desirable for a single diagnostic tool to provide a single comprehensive functionality in a seamless way to ease the use of the diagnostic tools, while still satisfying all the required utilizations of other diagnostic tools.

Figure 1:
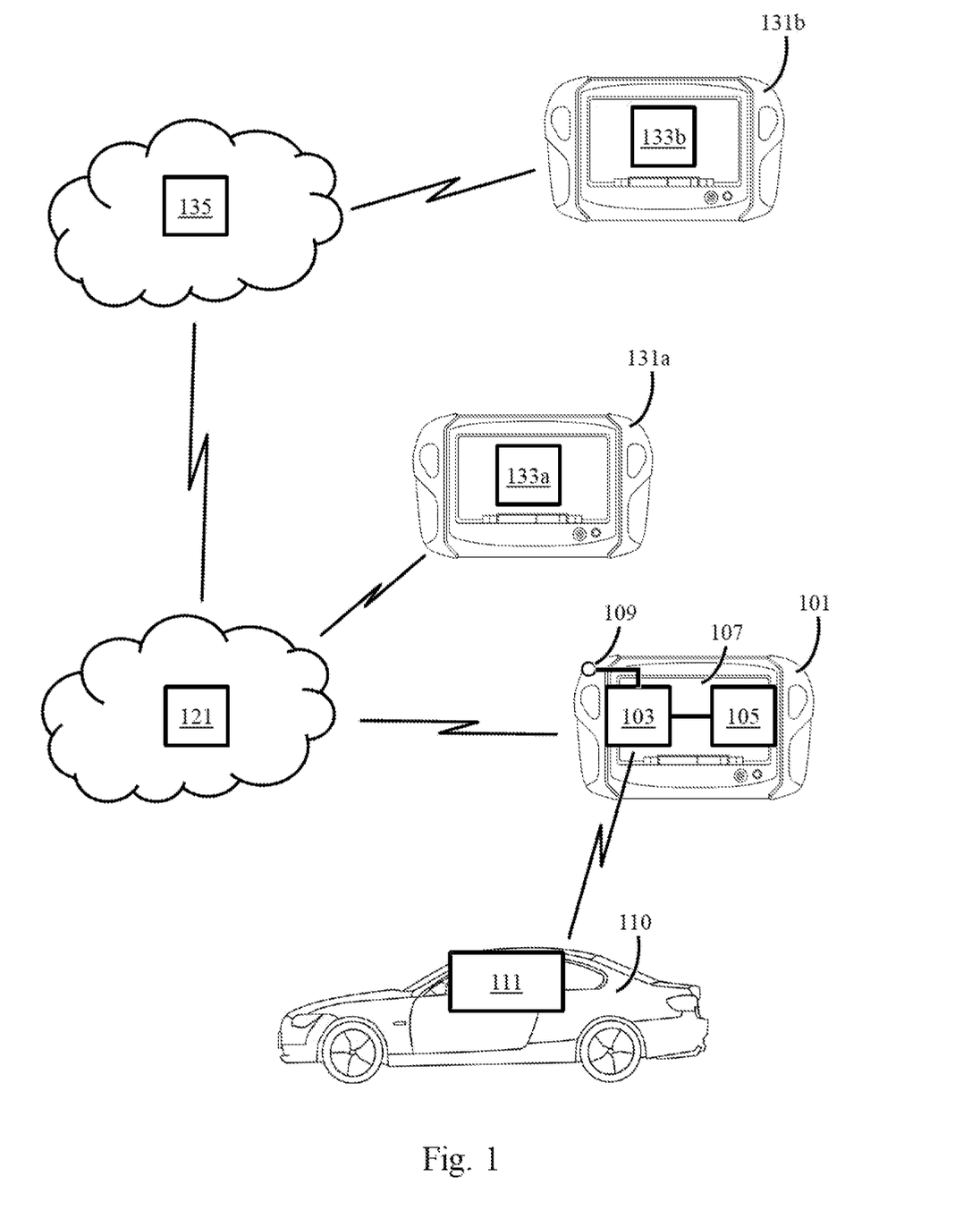
FIG. 1 is a diagrammatic illustration of a diagnostic system utilizing a diagnostic tool that is configured to provide diagnostic functions of other processors.

FIG. 1 provides a diagrammatic illustration of a system using a diagnostic tool 101 that provides a seamlessly-integrated comprehensive diagnostic experience. Diagnostic tool 101 comprises a diagnostic processor 103 and a memory 105 in data communication with diagnostic processor 103, as well a human-machine interface (HMI) 107 suitable for a user to interact with the diagnostic tool's functions. In the depicted embodiment HMI 107 comprises a touchscreen display, but other embodiments may comprise other human-machine interface elements such as buttons, soft buttons, keys, soft keys, haptic input, vocal input, stylus, or any other such interface element known to one of ordinary skill without deviating from the teachings disclosed herein.

In the depicted embodiment, memory 105 may comprise instructions stored thereon that, when executed by diagnostic processor 103, cause diagnostic processor 103 to perform functions of the diagnostic tool 101. Memory 105 may further comprise volatile portions thereof to store data useful to the completion of supported service actions of diagnostic tool 101. Memory 105 may be embodied as a non-transitory computer-readable storage medium or a machine-readable medium for carrying or having computer-executable instructions or data structures stored thereon. Such non-transitory computer-readable storage media or machine-readable medium may be any available media embodied in a hardware or physical form that can be accessed by a general purpose or special purpose computer. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

Diagnostic tool 101 additionally comprises a transceiver 109 configured to enable wireless data communication with other devices in the system. Transceiver 109 may be configured to communicate wirelessly via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. In the depicted embodiment, diagnostic tool 101 comprises a single transceiver 109 suitable for bi-directional wireless communication, but other embodiments may comprise distinct transmitter and receiver elements without deviating from the teachings disclosed herein. In the depicted embodiment, transceiver 109 comprises a wireless transceiver suitable for wireless data communication, but other embodiments may comprise wired connectivity. The wired connectivity may be embodied instead of or in addition to the wireless connectivity. A wired embodiment may comprise a TCP/IP connection, a local area network (LAN) connection, a plain-old-telephone-service (POTS) connection, an Internet protocol connection, an electrical wiring, a conductive channel, an electrical bus, a fiber optic pathway, or any other alternative embodiment known to one of ordinary skill in the art.

In the depicted embodiment, diagnostic tool 101 is in data communication with a vehicle 110 via a vehicle communication interface (VCI) 111 associated therewith. VCI 111 is operable to provide diagnostic in about vehicle 110, including information indicating conditions of the vehicle or components thereof. By way of example, and not limitation, VCI 111 may provide diagnostic information to diagnostic tool 101 indicating that components of vehicle 110 may require routine maintenance, repair, calibration, or any other service action known to one of ordinary skill without deviating from the teachings disclosed herein. The diagnostic information may additionally comprise vehicle identification data (VID) indicating the vehicles make, model, and a number of components of interest. The diagnostic data may further comprise a list of serviceable conditions, and diagnostic information describing those conditions. In some embodiments, the diagnostic information may comprise diagnostic trouble code (DTC) information that is specific to the particular make or model of vehicle 110, or a component thereof, without deviating from the teachings disclosed herein.

Diagnostic tool 101 may be associated with a particular user (not shown). A user operating diagnostic tool 101 may input user identification information in order to inform diagnostic tool 101 of any special circumstances pertaining to the user that may affect necessary aspects of service actions to address the serviceable conditions of vehicle 110. By way of example, and not limitation, a user may be restricted by contractual obligation with a manufacturer of vehicle 110 or a manufacturer of a component of vehicle 110. A user may be restricted by certification requirements related to the user's technical abilities, education, or certifications pertaining to vehicle service. A user may be restricted by statutory requirements or other legal restrictions pertaining to permissions of particular service actions for vehicles. A user may otherwise be restricted by requirements provided by an insurance provider. Other user-based restrictions may be enforced without deviating from the teachings disclosed herein.

In the depicted embodiment, diagnostic tool 101 may be operated by a number of different users, each of the users potentially having different restrictions associated with them. In order to accommodate multiple users, each user may sign in to a profile of diagnostic tool 101 using a login dialog. Other embodiments may comprise other identification methods for each user without deviating from the teachings disclosed herein. In some such embodiments, a user may access their profile using a physical credential such as an ID card, a barcode, a fob, or RFID chip without deviating from the teachings disclosed herein. In some such embodiments, a user may access their profile using a biometric credential such as a fingerprint scan, a voice authentication, a retinal scan, or a facial recognition authentication without deviating from the teachings disclosed herein.

Diagnostic tool 101 may utilize a number of different rules within a structured ruleset, each of which may be applied to one or more of the users thereof. The ruleset may be stored on memory 105, or accessed via transceiver 109 without deviating from the teachings disclosed herein. In the depicted embodiment, the ruleset may be updated to accommodate changes in the user's personal, legal, contractual, or professional status without deviating from the teachings disclosed herein. In some embodiments, updates to the user's status(es) may be provided to diagnostic tool 101 via the HMI 107. Additional facets of the ruleset will be discussed in greater detail later with respect to FIG. 2.

Returning to FIG. 1, Diagnostic tool 101 is configured to classify the diagnostic data received from vehicle 110 according to the ruleset. The classified diagnostic data may be partitioned into list subsets of serviceable conditions received from VCI 111. At least a first list subset is generated that comprises an unrestricted list subset. The unrestricted list subset comprises serviceable conditions that are not applicable to any restrictions defined by the rules in the ruleset that are applicable to the user. Other certified list subsets may be compiled the comprise one or more serviceable conditions that may only be addressed using a certified approach defined by the ruleset.

In order address the serviceable conditions appropriately, diagnostic tool 101 may transmit the associated diagnostic data to an intermediary processor 121 which may then relay that diagnostic information to one or more certified tools 131 that respond to the associated diagnostic data in a way that conforms to the ruleset. In the depiction of FIG. 1, certified tools 131 encompass certified tool 131a and certified tool 131b, which may comprise similar or identical hardware configurations without deviating from the teachings disclosed herein. Each of certified tools 131 comprises a certified processor 133 which is designated for use with respect to particular service actions according to the ruleset. In the depiction of FIG. 1, certified tool 131a comprises a certified processor 133a and certified tool 131b comprises a certified processor 133b. Certified processor 133a and certified processor 133b may comprise similar or identical hardware configurations without deviating from the teachings disclosed herein. By way of example, and not limitation, certified tool 131a may comprise a manufacturer-approved diagnostic device that a user is contractually obligated to use when performing service actions related to that manufacturer's vehicles. Use of certified tool 131a may be contractually specified by an agreement or license between the user and the manufacturer, or it may be a written condition to preserve the warranty of the component requiring a service action. In this embodiment, diagnostic tool 101 may send the associated certified list subset or other diagnostic data to certified tool 131a via intermediary processor 121, and receive an appropriate set of data in response that conforms to the requirements of the manufacturer. In this manner, diagnostic tool 101 may provide a seamless exchange between the user and the certified tool 131a without requiring the user to switch diagnostic devices during active service of vehicle 110. In the depicted embodiment, the service actions are guided by the operations of certified tool 131a in response to serviceable conditions indicated to require the certified tool 131a. In practice, diagnostic tool 101 may serve as an intermediary device for a user to access the functions of certified tool 131a (or any other certified tool) to address the associated serviceable actions. In this manner, the requirements of a particular diagnostic device are fulfilled without a user having to change diagnostic devices mid-service. In the depicted embodiment, diagnostic tool 101 may additionally provide intermediary connection between a certified tool 131 and the VCI 111. In this manner, each certified tool 131 is utilized to directly obtain diagnostic data and support the specified service actions according to the ruleset.

In the depicted embodiment, the presentation of information from the certified tools 131 may be reformatted to match the visual aesthetics of diagnostic tool 101. This reformatting may take place in real-time in response to data received from a certified tool 131. Such reformatting may advantageously provide a more streamlined and seamless user experience during service actions utilizing diagnostic tool 101. In some embodiments, the user may choose to disable the reformatting via a user-specified preference option within the software or firmware of diagnostic tool 101. In some embodiments, diagnostic tool 101 may not perform reformatting without deviating from the teachings disclosed herein.

Some additional certified tools 131 may be moderated in their connection to diagnostic tool 101. In the depicted embodiment, intermediary processor 121 also provides indirect communication with a third-party processor 135 to diagnostic tool 101. Third-party processor 135 may be utilized to provide access to additional certified tools 131. By way of example, and not limitation, certified tool 131b may be a tool specified by a manufacturer for a specific service action and controlled by the manufacturer but made available via a license agreement with the user. By way of example, and not limitation, third-party processor 135 may comprise a manufacturer's server, and access to certified tool 131b may arbitrated by third-party processor 135 via a license, subscription, or other business- or transaction-related arrangement between the user and the manufacturer. The arrangement is expressed within the ruleset. In the depicted embodiment, diagnostic tool 101 accesses the third-party processor 135 via the intermediary processor 121, but other embodiments may comprise different arrangements without deviating from the teachings disclosed herein.

In some embodiments, diagnostic tool 101 may have direct communication with third-party processor 135 without deviating from the teachings disclosed herein.

The system may additionally advantageously provide a user of diagnostic tool 101 with access to one or more of the certified tools 131 without requiring that the user purchase or house the associated certified tool 131. Utilization of this system can lower overhead costs for users of diagnostic tool 101 by providing access to the diagnostic functions of certified tools 131 via data communication with diagnostic tool 101. In the depicted embodiment, access to certified tools 131 may be arbitrated by the operators of intermediary processor 121 or third-party processor 135. In some embodiments, a user associated with diagnostic tool 101 may be provided remote access to the certified tools 131 in exchange for a fee. The fee paid may comprise a regular subscription fee, or an ad hoc payment without deviating from the teachings disclosed herein. In some embodiments, the operator of intermediary processor 121 or third-party processor 135 may function as a gatekeeper to a network of certified tools 131, and the operators of certified tools 131 may be compensated for providing access to their device in real time in response to providing their functionalities to a user of diagnostic tool 101. Other system configurations may comprise other or additional arrangements without deviating from the teachings disclosed herein.

The depicted embodiment comprises a system having one intermediary processor 121 and one third-party processor 135, each associated with a single certified tool 131. Other embodiments may comprise a different arrangement that may have a different number of intermediary processors 121, certified tools 131, or third-party processors 135 without deviating from the teachings disclosed herein.

In the depicted embodiment, diagnostic tool 101 comprises a tablet computing device, intermediary processor 121 comprises a cloud-based computing device, certified tools 131 each comprise a tablet computing device, and third-party processor 135 comprises a cloud-based computing device, but other embodiments may comprise other configurations of these computing devices without deviating from the teachings disclosed herein. Each of these computing devices may be embodied as a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art.

Figure 2:
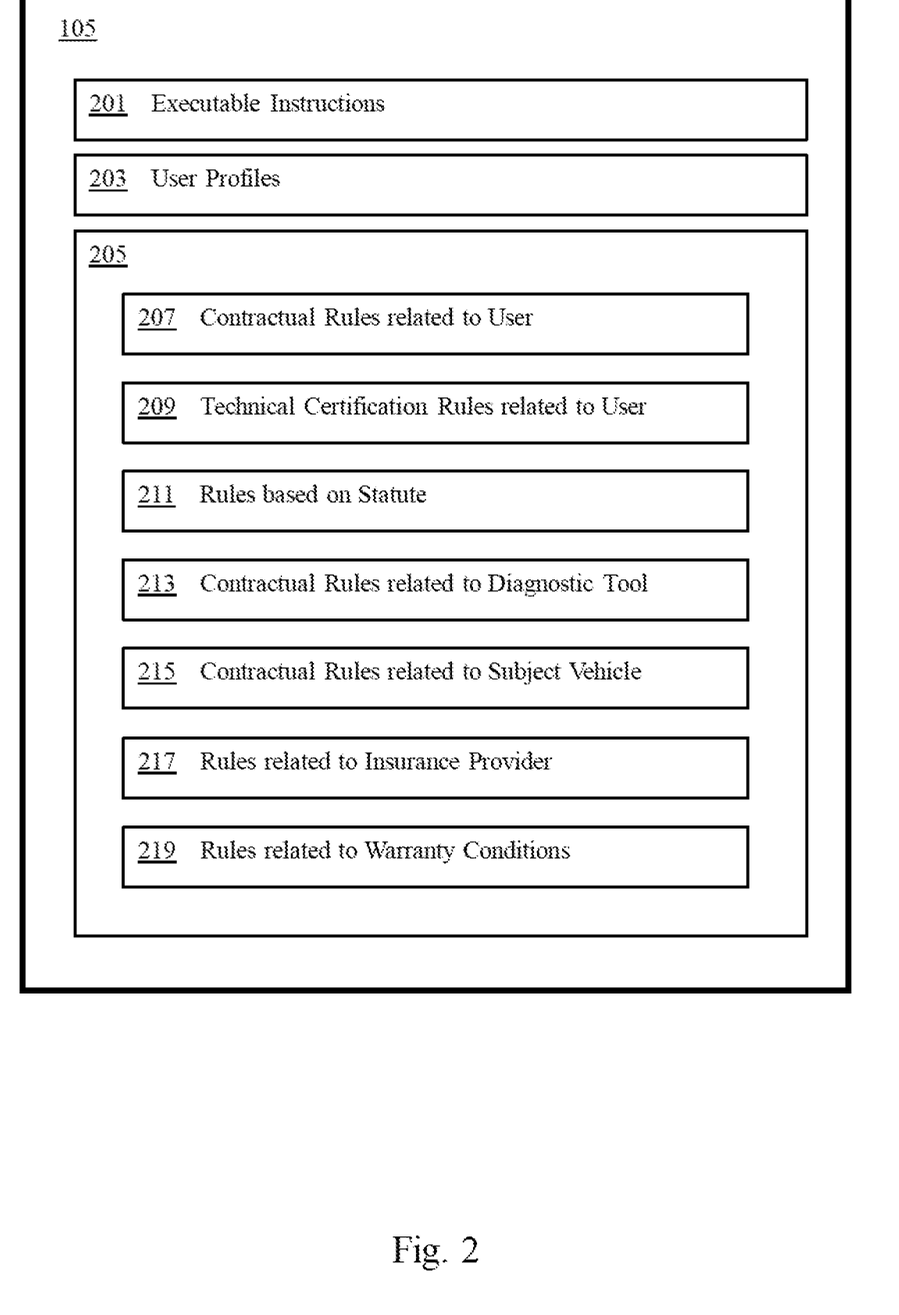
FIG. 2 is a diagrammatic illustration of a memory within a diagnostic tool that comprises a ruleset for controlling diagnostic operations of the diagnostic tool.

FIG. 2 is a diagrammatic illustration of information stored within memory 105. Memory 105 may comprise a set of executable instructions 201 suitable for operating a processor, such as diagnostic processor 103 (see FIG. 1). Memory 105 may additionally comprise a set of user profiles 203. User profiles 203 may comprise a volatile section of memory, such that user information for each user may be newly entered, removed, and updated in response to user input. User profiles 203 define a set of applicable rules within a ruleset 205 to be associated with each user.

Ruleset 205 comprises subsets of rules that pertain to different arrangements that may restrict the usability of diagnostic tool 101 (see FIG. 1). Each rule in a subset may be individually associated and activated with respect to a particular user profile. In some embodiments, ruleset 205 may be included as a part of each user profile 203 without deviation from the teachings disclosed herein. Each of the subsets 207-219 may be directed to specific scenarios associated with arrangements pertaining to the diagnostic tool 101. The rules of rule subsets 207-219 may utilize the user profile in conjunction with the acquired VID and diagnostic information describing vehicle 110 to determine if diagnostic tool 101 may be permitted to natively address serviceable conditions of the vehicle, or if certain serviceable conditions require the diagnostic tool 101 to establish data communication with a certified tool 131 (see FIG. 1).

Rule subset 207 comprises rules directed to contractual obligations that are directed to the user or the shop in which the user works. By way of example, and not limitation, a particular user may have a contractual obligation with a manufacturer to utilize one or more particular diagnostic devices other than diagnostic tool 100 when servicing components manufactured by that manufacturer. Another example may be a rule that specifies that users operating out of a particular shop are restricted in which devices they are permitted to use for a task, or with respect to a particular vehicle, because of a licensing agreement, sponsorship deal, or other contractual obligation that requires fulfillment. In some scenarios, a manufacturer may require a technician to utilize manufacturer-approved tools in order to obtain and maintain a particular certification from the manufacturer, and such an agreement would be reflected in rule subset 207 as well. Other contractually related reasons for restrictions on the usage of the native functions of diagnostic tool 101 may be included within rule subset 207 without deviating from the teachings disclosed herein.

Rule subset 209 comprises rules directed to technical certifications associated with the user or the shop in which the user works. A particular user may have technical certifications demonstrating legal clearances, education, vocational training, or technical specialties that pertain to service actions. By way of example, and not limitation, a user may have a legal certification with a local municipality to safety inspections requiring particular diagnostic devices. In another non-limiting example, diagnostic tool 101 may only be authorized for a particular service action if an associated user has a particular vocational training associated with the necessary service action. Other technical certification reasons for restrictions on the usage of the native functions of diagnostic tool 101 may be included within rule subset 209 without deviating from the teachings disclosed herein.

Rule subset 211 comprises rules directed to statutory requirements of the user, the shop in which the user works, or the vehicle. By way of example, and not limitation, a local municipality may require a particular device other than diagnostic tool 101 to perform a legally recognized emissions inspection of a vehicle. In another non-limiting example, some service actions may not be legally performed by a technician lacking a particular license or accreditation required by a government entity. Other statutory reasons for restrictions on the usage of the native functions of diagnostic tool 101 may be included within rule subset 211 without deviating from the teachings disclosed herein.

Rule subset 213 comprises rules directed to contractual obligations pertaining to the diagnostic tool 101. By way of example, and not limitation, a manufacturer may only honor a continued warranty service action if the service action is performed utilizing one or more particular diagnostic devices other than diagnostic tool 101. In another non-limiting example, an insurance company may have a contractual agreement with the user or the shop in which the user works that the insurance company will only certify and pay for certain service actions if they are performed using a particular diagnostic device other than diagnostic tool 101.

One or more of the rules in rule subset 213 may partially or completely overlap in scope with one or more of the rules in rule subset 207 without deviating from the teachings disclosed herein. Other contractual reasons related to diagnostic tool 101 for restrictions on the usage of native functions of the diagnostic tool 101 may be included within rule subset 213 without deviating from the teachings disclosed herein.

Rule subset 215 comprises rules directed to contractual obligations pertaining to the subject vehicle 110. By way of example, and not limitation, a manufacturer may only require that certain service actions, performed for particular models of vehicle utilize a particular diagnostic device other than diagnostic tool 101. In another non-limiting example, a newer model of vehicle may comprise diagnostic information that is not yet supported by the native functions of diagnostic tool 101, or that would require an update to the firmware, software, or support data of diagnostic tool 101 for proper service. One or more of the rules in rule subset 215 may partially or completely overlap in scope with one or more of the rules in rule subsets 207-213 without deviating from the teachings disclosed herein. Other contractual reasons related to diagnostic tool 101 for restrictions on the usage of native functions of the diagnostic tool 101 may be included within rule subset 215 without deviating from the teachings disclosed herein.

Rule subset 217 comprises rules directed to obligations pertaining to an insurance provider or an insurance policy associated with the vehicle. By way of example, and not limitation, an insurance provider may require that particular technical certifications be held by a user in order to utilize diagnostic tool 101 for certain service actions, otherwise a different diagnostic device must be used for a certified repair. In another non-limiting example, an insurance company may only authorize a service action for a vehicle if the vehicle is associated with a policy holder in good standing with the insurance company. In another non-limiting example, an insurance company may only authorize payment for a service action if the policy holder associated with the vehicle has provided a co-pay. In another non-limiting example, an insurance company may only authorize a service action if the technician utilizes a tool mandated by the manufacturer of the vehicle. One or more of the rules in rule subset 217 may partially or completely overlap in scope with one or more of the rules in rule subsets 207-215 without deviating from the teachings disclosed herein. Other contractual reasons related to diagnostic tool 101 for restrictions on the usage of native functions of the diagnostic tool 101 may be included within rule subset 217 without deviating from the teachings disclosed herein.

Rule subset 219 comprises rules directed to obligations pertaining to a warranty associated with the vehicle or a component of the vehicle. By way of example, and not limitation, an warranty policy may require that a particular technical certifications be held by a user in order to utilize diagnostic tool 101 for certain service actions. In another non-limiting example, a warranty provider may only authorize a service action for a vehicle if the vehicle is associated with a particular serviceable condition of the vehicle or component thereof. In another non-limiting example, an warranty provider may only authorize a service action if the technician utilizes a tool mandated by the manufacturer of the vehicle. One or more of the rules in rule subset 219 may partially or completely overlap in scope with one or more of the rules in rule subsets 207-217 without deviating from the teachings disclosed herein. Other contractual reasons related to diagnostic tool 101 for restrictions on the usage of native functions of the diagnostic tool 101 may be included within rule subset 219 without deviating from the teachings disclosed herein.

Although the depicted embodiment shows ruleset 205 as having a distinct number of rule subsets 207-219, other embodiments may comprise a different configuration of rule subsets without deviating from the teachings disclosed herein. Some embodiments may comprise additional rule subsets not explicitly disclosed here without deviating from the teachings disclosed herein. In some embodiments, ruleset 205 may not comprise individual rule subsets, and may instead comprise a single monolithic ruleset that is suitable to classify serviceable conditions of a vehicle or component of a vehicle without deviating from the teachings disclosed herein.

Figure 3:
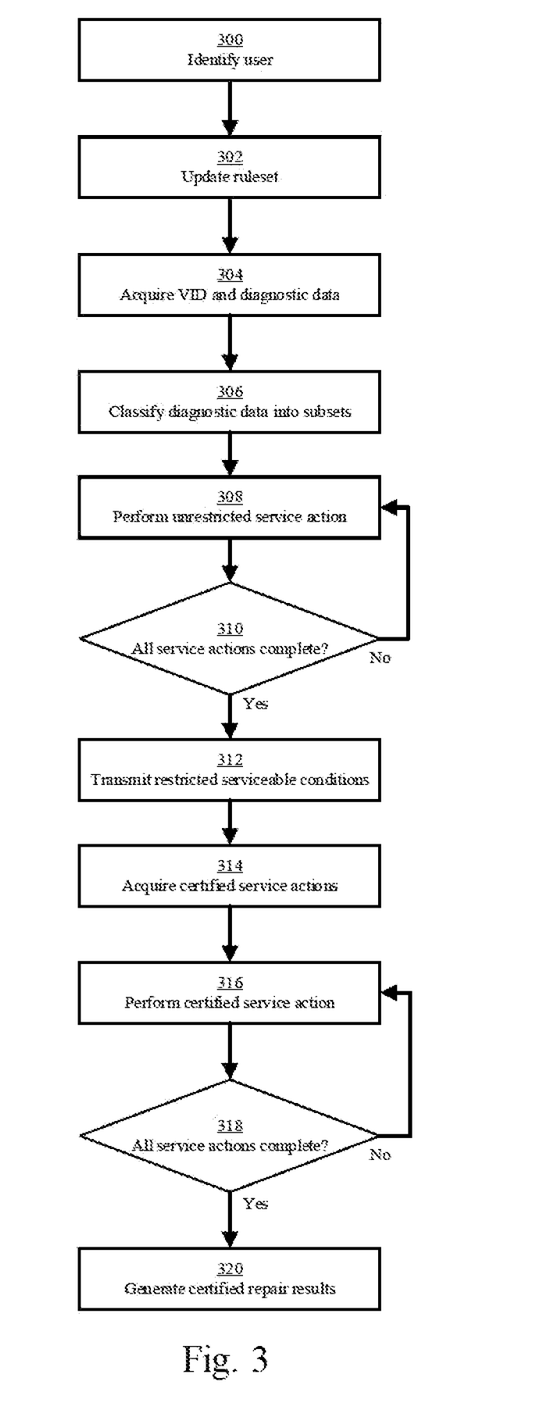
FIG. 3 is a flowchart illustrating a method of classifying serviceable conditions of a vehicle and providing guidance to a user of a diagnostic tool how to perform requisite service actions in a certified manner.

FIG. 3 shows a flowchart of a method of vehicle diagnostic functions and service actions guided by a diagnostic tool (such as diagnostic tool 101; see FIG. 1) configured to construct a seamless user experience and utilize a classification ruleset to ensure certifiable service. The method beings at step 300 where a user of a diagnostic tool is identified, and any additional information associated with the user is acquired. Additional information may comprise technical certifications, contractual obligations, legal certifications, or any other specialty data that may be associated with the user of the diagnostic tool. In the depicted embodiment, identification of the user at step 300 may additionally include identification of the shop in which the user is working, and any additional information about the shop. Additional information about the shop may comprise contractual obligations, legal certifications, or any other specialty data that may be associated with the shop that pertains to operation of the diagnostic tool for the purposes of service actions on a vehicle.

After the user information has been acquired, the method proceeds to step 302 where a ruleset associated with the user and the shop may be acquired, populated, or updated. Rules in the ruleset may define limitations of the operation of the user's diagnostic tool with respect to contractual obligations, technical certifications, statutory requirements, insurance requirements, or warranty requirements. The rules in the ruleset may comprise a different combination of subjects or include additional or different subjects other than those listed above without deviating from the teachings disclosed herein. In some embodiments, the ruleset associated with the diagnostic tool and the user may be static, and thus the method may not comprise step 302 without deviating from the teachings disclosed herein. In the depicted embodiment, the ruleset is updated after step 300, but other embodiments may comprise step 302 at different points in the method without deviating from the teachings disclosed herein. In some such embodiments, the ruleset may be updated in response to a user-generated input provided to the diagnostic tool at any point in the method. In some such embodiments, the ruleset may be updated in response to a determination that a rule restricting the utilization of the diagnostic tool is applicable or being enforced without deviating from the teachings disclosed herein.

The method then proceeds to step 304, where the diagnostic tool establishes communication with a vehicle communication interface (VCI) of the vehicle and acquires vehicle identification data (VID) and diagnostic data indicating the identity and conditions of the vehicle. The diagnostic data may comprise diagnostic trouble code (DTC) data. In the depicted embodiment, the diagnostic data comprises a list of serviceable conditions of the vehicle or components thereof that merit a service action. After the list of serviceable conditions is acquired, the method proceeds to step 306 where the ruleset is applied to the list of serviceable conditions to form a number of list subsets, each list subsets indicating one or more service actions. Each of the number of list subsets may define a subset of serviceable actions that require the same tool or set of tool to accommodate the serviceable condition according to the rules. A first list subset may comprise an unrestricted list subset, which is characterized by all of the serviceable conditions that are not associated with any rules within the ruleset that require the use of a diagnostic device other than the diagnostic tool. The list subsets may additionally comprise one or more certified list subsets, each of the certified list subsets characterized by serviceable conditions that are associated with rules requiring one or more certified tools in addition to the diagnostic tool according to the ruleset. In some embodiments, a vehicle may only comprise serviceable conditions that populate an unrestricted list subset without deviating from the teachings disclosed herein. In some embodiments, a vehicle may only comprise serviceable conditions that populate one or more certified list subsets without deviating from the teachings disclosed herein.

In the depicted method, the diagnostic tool proceeds after classification of the serviceable conditions into list subsets to step 308, where the serviceable conditions associated with the unrestricted list subset may be addressed. At step 308, the diagnostic tool may guide a user through the steps of a service action suitable to address a serviceable condition of the vehicle not restricted by the ruleset. The user is guided through the service actions by an unrestricted output signal generated by the diagnostic tool indicating the steps necessary to appropriately complete each service action. In the depicted embodiment, the unrestricted output signal is presented to the user via a display, but other embodiments may comprise other arrangements without deviating from the teachings disclosed herein. Once the service action is completed, the serviceable condition is removed from the unrestricted list subset and the method proceeds to step 310 to determine if all unrestricted service actions have been completed. If additional serviceable conditions populate the unrestricted list subset, the method returns to step 308 to address the next serviceable condition on the unrestricted list subset. This return is performed iteratively until the unrestricted list subset is empty. Once the unrestricted list subset is empty, the method proceeds to step 312. It is noted that for vehicles that do not initially populate the unrestricted list subset during step 306, step 308 may effectively be skipped because no associated service actions are indicated by the diagnostic tool. Such scenarios do not deviate from the teachings disclosed herein.

At step 312, the certified list subsets of serviceable conditions are transmitted by the diagnostic tool to another device. In the depicted embodiment, each of the certified list subsets may be transmitted to an intermediary processor, but other embodiments may transmit the certified list subsets to directly to a certified tool. In the depicted embodiment, each of the certified list subsets may comprise associated VID and diagnostic data with each serviceable condition that is associated with a rule in the ruleset. Once the serviceable conditions, VID, and diagnostic data are transmitted to a certified tool at step 312, the method proceeds to step 314 where the certified tool provides service action data to the diagnostic tool suitable to guide the user through service actions suitable to address the serviceable conditions of a certified list subset. In some embodiments, the data communication established between the diagnostic tool and the certified tool may be configured such that the diagnostic tool acts an intermediary device between the certified tool and the VCI of the vehicle. In such embodiments, the diagnostic tool may effectively and remotely provide the functionality of the certified tool to the user via the diagnostic tool.

After the service action data is acquired at step 314, the method proceeds to step 316, where the serviceable conditions associated with a certified list subset may be addressed. At step 316, the diagnostic tool may guide a user through the steps of a service action suitable to address a serviceable condition of the vehicle restricted by at least one rule in the ruleset. The user is guided through the service actions by a certified output signal generated by a certified tool indicating the steps necessary to appropriately complete each service action. In the depicted embodiment, the certified output signal is presented to the user via a display, but other embodiments may comprise other arrangements without deviating from the teachings disclosed herein. Once the service action is completed, the serviceable condition is removed from its associated certified list subset and the method proceeds to step 318 to determine if all certified service actions have been completed. If additional serviceable conditions populate the certified list subset, the method returns to step 316 to address the next serviceable condition on the certified list subset. This return is performed iteratively until each certified list subset is empty. It is noted that for vehicles that do not initially populate the unrestricted list subset during step 306, step 316 may effectively be skipped because no associated service actions are indicated by the diagnostic tool. Such scenarios do not deviate from the teachings disclosed herein.

In the depicted embodiment, step 318 may determine Whether all certified list subsets are empty upon completion of a service action. If a plurality of certified list subsets are populated, step 318 may move to step 316 by selecting a different certified list subset if the current certified list subset has been emptied in response to completed service actions. In the depicted embodiment, all certified list subsets are populated before leaving step 314. In some embodiments, the method may proceed from step 318 to 312 to address a different certified list subset by establishing data communication with a different certified tool and populating different service action data without deviating from the teachings disclosed herein.

In the depicted embodiment, steps 308 and 310 are depicted as being performed prior to the acquisition of service action data for serviceable conditions associated with any rules in the ruleset. Other embodiments may perform steps 308 and 310 in a different order after step 312 or 314 without deviating from the teachings disclosed herein. In some embodiments, steps 308 and 310 may be iteratively performed after steps 316 and 318 without deviating from the teachings disclosed herein.

Once a unrestricted list subset and all certified list subsets are empty, the method proceeds to step 320. At step 320, the diagnostic tool gathers repair results from any certified tools relied upon during the method, as well as generates its own repair results associated with the unrestricted service actions, and collates all the repair results into a set of certified repair results. The certified repair results may be stored in a memory, presented to a user, or transmitted to a device other than the diagnostic tool.

In the depicted embodiment, the method is performed by a diagnostic tool, such as diagnostic tool 101 (see FIG. 1). In some embodiments, the method is performed by a processor executing Instructions stored upon a non-transitory computer-readable medium.

While exemplary embodiments are described above, it is not intended that these embodiments describe all possible forms of the disclosed apparatus and method. Rather, the words used in the specification are words of description rather than limitation, and it is, understood that various changes may be made without departing from the spirit and scope of the disclosure as claimed. The features of various implementing embodiments may be combined to form further embodiments of the disclosed concepts.

What is claimed is:

1. A method for generating a set of certified repair results, the method comprising:
   identifying a user of a diagnostic processor and a ruleset associated with the user;
   establishing data communication between the diagnostic processor and a vehicle communication interface (VCI) of a subject vehicle;
   identifying vehicle identification data (VID) associated with the subject vehicle via the VCI;
   requesting diagnostic data from the subject vehicle via the VCI;
   identifying an unrestricted list subset of diagnostic data according to the ruleset and VID;
   identifying a certified list subset of diagnostic data according to the ruleset and VID;
   completing an unrestricted service action of the subject vehicle with respect to the unrestricted list subset using the diagnostic processor, the unrestricted list subset comprising serviceable conditions that are not applicable to any restrictions defined by the ruleset;
   generating first repair results in response to the completed unrestricted service action;
   transmitting the restricted list subset from the diagnostic processor to a certified processor distinct from the diagnostic processor, the certified processor being suitable to address the restricted list subset of diagnostic data according to the ruleset and in data communication with the diagnostic processor;
   completing a certified service action of the subject vehicle with respect to the certified list subset using the certified processor, the certified list subset comprising one or more serviceable conditions that may only be addressed using a certified approach defined by the ruleset;
   generating second repair results in response to the completed second service action; and
   generating certified repair results by combining the first repair results and the second repair results,
   wherein the second service action comprises transmitting service information from the certified processor to the diagnostic processor, and providing the transmitted service information to the user via a display in data communication with the diagnostic processor.

2. The method of claim 1, wherein the certified processor is remotely located from the diagnostic processor, and the data communication between the diagnostic processor and the certified processor comprises a network.

3. The method of claim 1, wherein the second service action comprises the certified processor in data communication with the VCI using the diagnostic processor as an intermediary between the certified processor and the VCI.

4. The method of claim 1, wherein the certified processor comprises a plurality of certified processors, each of the plurality of certified processors being distinct and being associated with a distinct subset of the ruleset.

5. The method of claim 1, wherein the ruleset is updated in response to an indication of user certification pertaining to a subset of the ruleset.

6. The method of claim 5, wherein the user certification comprises an indication of completion of a technical certification.

7. The method of claim 1, wherein data communication between diagnostic processor and the certification process is arbitrated by an intermediary processor.

8. The method of claim 7, wherein the intermediary processor permits data communication between the diagnostic processor and the certification processor in response to an indication that a fee associated with the user has been paid.

9. A vehicle diagnostic system configured to generate a set of certified repair results comprising:
   a diagnostic processor;
   a memory in data communication with the diagnostic processor, the memory storing thereon a ruleset associated with a user of the vehicle diagnostic system;
   a display in data communication with the diagnostic processor;
   a transceiver in data communication with the diagnostic processor; and
   a certified processor in data communication with the diagnostic processor via the transceiver,
   wherein the diagnostic processor is configured to establish data communication with a vehicle communication interface (VCI) of a subject vehicle during a service action, wherein the diagnostic processor is further configured to acquire vehicle identification data (VID) and diagnostic data from the VCI, wherein the diagnostic processor is further configured to distinguish an unrestricted list subset of the diagnostic data and a restricted list subset of the diagnostic data according to the ruleset, wherein the unrestricted list subset comprises serviceable conditions that are not applicable to any restrictions defined by the ruleset and wherein the certified list subset comprises one or more serviceable conditions that may only be addressed using a certified approach defined by the ruleset, wherein the diagnostic processor is further configured to generate a first output signal for the display guiding a user to address the unrestricted diagnostic data in response to the unrestricted diagnostic data, and wherein the diagnostic processor is configured to act as an intermediary transceiver between the VCI and the certified processor to address the restricted diagnostic data wherein the certified processor is configured to generate a second output signal for the display guiding a user to address the restricted diagnostic data in response to receiving the restricted diagnostic data.

10. The vehicle diagnostic system of claim 9, wherein the certified processor comprises a plurality of certified processors, each of the plurality of certified processors being distinct and being associated with a distinct subset of the ruleset.

11. The vehicle diagnostic system of claim 9, further comprising a human-machine interface (HMI) in data communication with the diagnostic processor.

12. The vehicle diagnostic system of claim 11, wherein the ruleset is dynamically-updateable in response to user input provided to the HMI.

13. The vehicle diagnostic system of claim 12, wherein the ruleset is updated in response to an indication of a user certification pertaining to a subset of the ruleset.

14. The vehicle diagnostic system of claim 13, wherein the user certification comprises an indication of completion of a technical certification.

15. The vehicle diagnostic system of claim 9, wherein the display comprises a touchscreen display.

16. The vehicle diagnostic system of claim 9, further comprising an intermediary processor, wherein the data communication between diagnostic processor and the certification processor is arbitrated by the intermediary processor.

17. The vehicle diagnostic system of claim 9, wherein the intermediary processor permits data communication between the diagnostic processor and the certification processor in response to an indication that a fee associated with the user has been paid.

18. A non-transitory computer-readable storage medium having instructions stored thereon that, when executed by a processor, cause the processor to perform the steps of:
  identifying a user of the processor and a ruleset associated with the user;
  establishing data communication between the processor and a vehicle communication interface (VCI) of a subject vehicle;
  identifying vehicle identification data (VID) associated with the subject vehicle via the VCI;
  requesting diagnostic data from the subject vehicle via the VCI;
  identifying an unrestricted list subset of diagnostic data according to the ruleset;
  identifying a restricted list subset of diagnostic data according to the ruleset and VID;
  completing an unrestricted service action of the subject vehicle with respect to the unrestricted list subset using the diagnostic processor, the unrestricted list subset comprising serviceable conditions that are not applicable to any restrictions defined by the ruleset;
  generating first results data in response to the completed first service;
  transmitting the certified list subset from the diagnostic processor to a certified processor, the certified processor being suitable to address the restricted list subset of diagnostic data according to the ruleset and in data communication with the processor, the certified list subset comprising one or more serviceable conditions that may only be addressed using a certified approach defined by the ruleset;
  completing a second service action of the subject vehicle with respect to the restricted diagnostic data using the certified processor;
  receiving second repair results from the certified processor in response to the completed second service; and
  generating certified repair results by combining the first repair results and the second repair results.

19. The non-transitory computer-readable storage medium of claim 18, further storing thereon instructions that, when executed by a processor, cause the processor to further perform the steps of:
  generating an output signal indicating the certified repair results, and
  transmitting the output signal to a display.

20. The non-transitory computer-readable storage medium of claim 18, further storing thereon instructions that, when executed by a processor, cause the processor to further perform the steps of:
  updating the ruleset in response to an indication of a user certification pertaining to a subset of the ruleset.

* * * * *